United States Patent
Frederiksen et al.

(10) Patent No.: US 12,328,675 B2
(45) Date of Patent: Jun. 10, 2025

(54) METHODS AND APPARATUSES FOR CONTROL OF CROSS-BANDWIDTH PART (BWP) WAKE UP SIGNALING (WUS) ACTIVATION

(71) Applicant: Nokia Technologies Oy, Espoo (FI)

(72) Inventors: Frank Frederiksen, Klarup (DK); Daniela Laselva, Klarup (DK)

(73) Assignee: Nokia Technologies Oy, Espoo (FI)

( * ) Notice: Subject to any disclaimer, the term of this patent is extended or adjusted under 35 U.S.C. 154(b) by 637 days.

(21) Appl. No.: 17/761,722

(22) PCT Filed: Aug. 19, 2020

(86) PCT No.: PCT/FI2020/050539
§ 371 (c)(1),
(2) Date: Mar. 18, 2022

(87) PCT Pub. No.: WO2021/064280
PCT Pub. Date: Apr. 8, 2021

(65) Prior Publication Data
US 2022/0346017 A1    Oct. 27, 2022

Related U.S. Application Data (60) Provisional application No. 62/909,415, filed on Oct. 2, 2019.

(51) Int. Cl.
| | | |
|---|---|---|
| H04W 52/02 | (2009.01) | |
| H04W 72/044 | (2023.01) | |
| H04W 72/23 | (2023.01) | |
| H04W 76/28 | (2018.01) | |

(52) U.S. Cl.
CPC ... *H04W 52/0232* (2013.01); *H04W 52/0274* (2013.01); *H04W 72/044* (2013.01); *H04W 72/23* (2023.01); *H04W 76/28* (2018.02)

(58) Field of Classification Search
CPC .............................................. H04W 76/20–38
See application file for complete search history.

(56) References Cited

U.S. PATENT DOCUMENTS

| | | | |
|---|---|---|---|
| 11,218,963 B2 * | 1/2022 | Nam | H04L 5/0098 |
| 2019/0090299 A1 | 3/2019 | Ang et al. | |
| 2019/0103954 A1 * | 4/2019 | Lee | H04L 5/0098 |
| 2019/0254110 A1 | 8/2019 | He et al. | |
| 2019/0281504 A1 * | 9/2019 | Su | H04W 76/28 |
| 2020/0037247 A1 * | 1/2020 | Liao | H04W 52/0216 |

(Continued)

OTHER PUBLICATIONS

"New WID: UE Power Saving in NR", 3GPP TSG RAN Meetings #84, RP-191607, Agenda: 9.4.6, CATT, Jun. 3-6, 2019, 5 pages.

(Continued)

*Primary Examiner* — San Htun
(74) *Attorney, Agent, or Firm* — Barta Jones, PLLC (57) ABSTRACT

Systems, methods, apparatuses, and computer program products for control of cross-bandwidth part (BWP) wake up signaling (WUS) activation are provided. One method includes configuring a user equipment with a wake up signaling (WUS) bandwidth part (BWP) and a plurality of non-wake up signaling (WUS) bandwidth part (BWPs), and transmitting a wake up signaling (WUS) indication.

14 Claims, 4 Drawing Sheets

(56) References Cited

U.S. PATENT DOCUMENTS

2020/0221384 A1* 7/2020 Ang ..................... H04L 5/0092
2021/0068055 A1* 3/2021 Nam ..................... H04L 5/0091

OTHER PUBLICATIONS

"3rd Generation Partnership Project; Technical Specification Group Radio Access Network; NR; Physical channels and modulation (Release 15)", 3GPP TS 38.211, V15.6.0, Jun. 2019, pp. 1-97.

"Views of Power saving WI scope for Rel-16", 3GPP TSG-RAN Meetings #85, RP-191931, Agenda: 9.4.6, OPPO, Sep. 16-20, 2019, pp. 1-4.

"3rd Generation Partnership Project; Technical Specification Group Radio Access Network; NR; User Equipment (UE) radio access capabilities (Release 15)", 3GPP TS 38.306, V15.7.0, Sep. 2019, pp. 1-55.

"Report of 3GPP TSG RAN2#107 meeting", 3GPP TSG-RAN WG2 meeting #107bis, R2-1912001, Agenda: 2.2, ETSI MCC, Aug. 26-30, 2019, pp. 1-317.

"Offline Discussion Summary of PDCCH-based Power Saving Signal/Channel", 3GPP TSG RAN WG1 Meeting #98, R1-1909799, Agenda: 7.2.9.1, CATT, Aug. 26-30, 2019, pp. 1-29.

International Search Report and Written Opinion received for corresponding Patent Cooperation Treaty Application No. PCT/FI2020/050539, dated Nov. 13, 2020, 19 pages.

"Potential Techniques for UE Power Saving", 3GPP TSG-RAN WG1 #96, R1-1903016, Agenda: 7.2.9.2, Qualcomm Incorporated, Feb. 25-Mar. 1, 2019, pp. 1-33.

"PDCCH-based power saving channel design", 3GPP TSG-RAN WG1 #98, R1-1909275, Agenda: 7.2.9.1, Qualcomm Incorporated, Aug. 26-30, 2019, pp. 1-11.

* cited by examiner

METHODS AND APPARATUSES FOR CONTROL OF CROSS-BANDWIDTH PART (BWP) WAKE UP SIGNALING (WUS) ACTIVATION

RELATED APPLICATION

This application was originally filed as PCT Application No. PCT/FI2020/050539, filed on 19 Aug. 2020, which claims priority from Application No. U.S. 62/909,415, filed on 2 Oct. 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for control of cross-bandwidth part (BWP) wake up signaling (WUS) activation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

A first embodiment may be directed to a method that includes configuring a UE with a WUS BWP and a plurality of non-WUS BWPs. The method may also include transmitting a WUS indication, wherein, when the UE moves from a first non-WUS BWP of the plurality of non-WUS BWPs to the WUS BWP, the WUS indication received on the WUS BWP triggers the UE to switch back to the first non-WUS BWP for PDCCH monitoring during the next on-duration.

A second embodiment may be directed to a method that includes configuring a UE with a WUS BWP and a plurality of non-WUS BWPs. The method may also include transmitting an indication on a first of the non-WUS BWPs of the plurality of the non-WUS BWPs, transmitting a WUS indication on the WUS BWP, which in turn results in subsequent transmission of PDCCH towards this UE happens on one the first of the non-WUS BWPs of the plurality of non-WUS BWPs.

A third embodiment may be directed to a method that includes a UE being configured with a WUS BWP and a plurality of non-WUS BWPs. The method may also include receiving a WUS indication, causing the UE to move from a first non-WUS BWP of the plurality of non-WUS BWPs to the WUS BWP, the WUS indication received on the WUS BWP triggering the UE to switch back to the first non-WUS BWP for PDCCH monitoring during the next on-duration.

A fourth embodiment is directed to a method that may include configuring a UE with a plurality of WUS BWPs and a plurality of non-WUS BWPs. Each of the WUS BWPs may be associated with one of the non-WUS BWPs. The method may also include transmitting a WUS indication to the UE wherein, when the UE receives the WUS while being on a WUS BWP, the WUS causes the UE to switch to the non-WUS BWP associated with the WUS BWP.

A fifth embodiment is directed to a method that may include configuring a UE with a WUS BWP for extreme power saving and at least one WUS BWP for normal operation.

The UE may be configured to operate on the normal WUS-based BWP for part of the operation and to switch to and back from the WUS BWP for extreme power saving under certain conditions. The method may also include transmitting a WUS indication to the UE.

According to a variant, the transmitting of the WUS indication may include transmitting a WUS indication that comprises an implicit indication to the UE to wake up on the previously used BWP.

According to a variant of any of the above embodiments, the WUS indication may trigger further action. Such further action may include modifying or deactivating dormant behavior.

In another variant, the method may also include configuring a timer associated to the operation on the WUS BWP and, upon expiry of the timer, the UE may change behaviour for autonomous BWP selection such that the detection of the WUS on the WUS BWP may cause the UE to take other actions. In one example, the other actions may include disabling the BWP switching and monitoring for PDCCH during on-duration on the current WUS BWP.

A sixth embodiment is directed to a method that may include a UE receiving a configuration, from a network, for a WUS BWP and a plurality of non-WUS BWPs. The method may also include, after moving from a first non-WUS BWP of the plurality of non-WUS BWPs to the WUS BWP, receiving a WUS indication and switching back to the first non-WUS BWP for PDCCH monitoring during the next on-duration.

A seventh embodiment is directed to a method that may include a UE receiving, from a network, a configuration for a plurality of WUS BWPs and a plurality of non-WUS BWPs. Each of the WUS BWPs may be associated with one of the non-WUS BWPs. The method may also include receiving a WUS indication while on a WUS BWP, switching to the non-WUS BWP associated with the WUS BWP.

According to a variant, the switching to the non-WUS BWP associated with the WUS BWP may be done irrespective of which non-WUS BWP the UE moved to the current WUS BWP from.

An eighth embodiment is directed to a method that may include a UE receiving, from a network, a configuration for a WUS BWP for extreme power saving and at least one WUS BWPs for normal operation. The method may also include operating on the normal WUS-based BWP for part of the operation and switching back and forth from the WUS BWP for extreme power saving under certain conditions.

In a variant, the part of the operation may include during short DRX cycles. In a variant, the certain conditions may include between long DRX cycles.

In a variant, the WUS indication may include an implicit indication to the UE to wake up on the previously used BWP.

In some variants, the method may also include receiving a configuration for a timer associated to the operation on the WUS BWP and, upon expiry of the timer, changing UE behaviour for autonomous BWP selection such that the detection of the WUS on the WUS BWP causes the UE to take other actions. According to a variant, the other actions may include disabling the BWP switching and monitoring for PDCCH during on-duration on the current WUS BWP.

A ninth embodiment is directed to an apparatus including at least one processor and at least one memory comprising computer program code. The at least one memory and computer program code may be configured, with the at least one processor, to cause the apparatus at least to perform the method according to the first embodiment, second embodiment, third embodiment, fourth embodiment, fifth embodiment, sixth embodiment, seventh embodiment, eighth embodiment, and/or any other embodiments discussed herein, or any of the variants described above.

A tenth embodiment is directed to an apparatus that may include circuitry configured to perform the method according to the first embodiment, second embodiment, third embodiment, fourth embodiment, fifth embodiment, sixth embodiment, seventh embodiment, eighth embodiment, and/or any other embodiments discussed herein, or any of the variants described above.

An eleventh embodiment is directed to an apparatus that may include means for performing the method according to the first embodiment, second embodiment, third embodiment, fourth embodiment, fifth embodiment, sixth embodiment, seventh embodiment, eighth embodiment, and/or any other embodiments discussed herein, or any of the variants described above.

A twelfth embodiment is directed to a non-transitory computer readable medium comprising program instructions stored thereon for performing at least the method according to the first embodiment, second embodiment, third embodiment, fourth embodiment, fifth embodiment, sixth embodiment, seventh embodiment, eighth embodiment, and/or any other embodiments discussed herein, or any of the variants described above.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for control of cross-bandwidth part (BWP) wake up signaling (WUS) activation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

The $3^{rd}$ generation partnership project (3GPP) is defining a physical downlink control channel (PDCCH)-based power saving signal/channel to instruct the UE to wake up at the next discontinuous reception (DRX) on-duration. This signal may be denoted as wake up signal (WUS) as it is indeed used to indicate to the UE to initiate PDCCH monitoring (wake up) for scheduled data at the coming on-duration. If a UE does not receive the WUS during the network-defined WUS occasion(s), the UE may assume there is no data and can skip monitoring the PDCCH during the next DRX On-Duration, thereby saving power when no data is present.

The bandwidth part (BWP) concept is defined in 3GPP NR Release-15. More specifically, a BWP is defined such that a carrier bandwidth part is a contiguous set of physical resource blocks, selected from a contiguous subset of the common resource blocks for a given numerology and cyclic prefix on a given carrier (see 3GPP TS 38.211, 4.4.5).

According to Release-15, in frequency division duplexing (FDD), the UE can be configured with an initial downlink (DL)/uplink (UL) BWP plus up to dedicated 4 DL BWPs and up to 4 dedicated UL BWPs in a serving cell. However, only one carrier bandwidth part can be active at a given time. The UE is not expected to transmit/receive outside the active UL/DL bandwidth part, with an exception of measurement gaps. Therefore, transmission/reception of physical uplink shared channel (PUSCH), physical uplink control channel (PUCCH), physical downlink shared channel (PDSCH), PDCCH, channel state information (CSI)-reference signals (RS), or tracking reference signal (TRS), or system information (SI) acquisition happens only within the active BWP. This means that the radio resource allocation in frequency to a UE should be within its active BWP(s) using the associated numerology. For initial access and until the UE's configuration in a cell is received via, e.g., radio resource control (RRC) signaling, the initial bandwidth part detected from system information is used.

Currently, per Release-15, the active BWP switching can be performed via a scheduling downlink control indication (DCI) on the PDCCH or a timer-based mechanism. When using the scheduling DCI, the network explicitly instructs the UE with the DCI to switch the active BWP from the current BWP to any of the configured BWPs. For the timer-based mechanism, if the BWP inactivity timer (bwp-InactivityTimer) expires, the UE autonomously switches the active BWP to the BWP associated with defaultDownlinkBWP-Id (if configured) or to the initialDownlinkBWP (if defaultDownlinkBWP-Id is not configured).

Several possible aspects associated with BWP reconfiguration scenarios and the associated switching delays are being considered. Depending on the different scenarios and different types for BWP switching delay based on UE type 1 or 2 capability signalling, the BWP switching delay will differ and may be assumed as high as 3 slots for type 2 UEs ((see 3GPP TS 38.306).

The notion of a WUS BWP, which is a BWP dedicated primarily for WUS purposes, to be configured with WUS and optimized for UE power saving has been considered. This assumes that the WUS configuration (comprising for instance the location of the WUS occasion(s) compared to the DRX On-Duration) will be BWP specific. It is noted that, alternatively, the WUS configuration could be associated to the DRX configuration, where the DRX-Configuration is cell group specific.

One proposal is that there could be a default WUS BWP (which might or might not be different from the default BWP) in case multiple BWPs are configured with WUS. It is also proposed that the UE switches autonomously to such default WUS BWP at the entering of a long DRX cycle in the current BWP to benefit from power saving. However, the network would still need to use a DCI command to switch back the UE from the default WUS BWP to the BWP tailored for data transmission in the presence of data, leading to the associated latency. Also, such DCI command will trigger DRX timers to extend the active time, thereby increasing the UE power consumption. Thus, overall, it may lead to a negative effect.

Another proposal relates to the notion of BWP switching based on WUS triggering, which—combined with the above—would allow the UE to autonomously switch from the default WUS BWP to a suitable BWP for data transmission upon WUS reception. However, it has not been determined what a suitable BWP that the UE should use, and how the network can control how the UE uses it.

Certain embodiments described herein utilize the approach of "BWP switching based on WUS triggering" or, in other words, "cross-BWP WUS activation" in which the WUS received in the default WUS BWP may be used as an implicit network signalling to activate a different BWP where the UE would monitor the PDCCH during the next on-duration. Some example embodiments aim to control how this switch should be done when multiple BWPs are configured to the UE.

Certain WUS related agreements have already been made as part of the 3GPP normative work as follows. For example, the PDCCH-based WUS (in short PDCCH-WUS) may trigger a MAC entity to "wake up" to monitor PDCCH at reception of the PDCCH-based power saving signal/channel for the next occurrence of the drx-onDurationTimer. The PDCCH-WUS is considered jointly with DRX, i.e., it is configured when DRX is configured. The PDCCH-WUS may be monitored at occasions located at a configured offset before the start of the drx-onDurationTimer. The offset is part of a physical layer design. On a PDCCH-WUS occasion that a UE is monitoring, if the UE is indicated to wake-up to monitor the PDCCH during the next occurrence of the drx-onDurationTimer, the UE starts the drx-onDurationTimer at its next occasion. Otherwise, the UE does not start the drx-onDurationTimer at the next occasion. The UE does not monitor WUS during active time. If the UE is in DRX active time during a PDCCH-WUS occasion, the UE may start the drx-onDurationTimer at its next occasion as in legacy procedures. The WUS may be configured on the primary cell (PCell) with carrier aggregation (CA) and special cell (SpCell) with dual connectivity (DC) (i.e., PCell on master cell group (MCG) and PSCell on secondary cell group (SCG)). Radio link monitoring (RLM) and radio resource management (RRM) measurements are not impacted by WUS design (i.e., the UE continues to measure the required reference signals as per RRM requirements). It may also be assumed that a UE monitors the PDCCH-based power saving signal/channel outside active time being configured on the active BWP in an active cell.

According to certain embodiments, the network (e.g., gNB or NG-RAN node) may configure a UE with one WUS BWP (i.e., a BWP configured with WUS) and more than one non-WUS BWP (i.e., a BWP not configured with WUS). In an embodiment, after the UE moves from a first non-WUS BWP to the WUS BWP, the reception of the WUS (on the WUS BWP) may trigger the UE to switch back to the first non-WUS BWP for PDCCH monitoring during the next on-duration.

In some embodiments, the network may configure the UE with multiple WUS BWPs (e.g., to allow different WUS configurations on different BWPs) and multiple non-WUS BWPs, where each WUS BWP is associated with one of the non-WUS BWP. According to an embodiment, upon receiving the WUS while being on a WUS BWP, the UE may switch to the associated non-WUS BWP, irrespectively from which non-WUS BWP the UE moved to the current WUS BWP in the first place.

According to some other embodiments, the network may configure the UE with one or more WUS BWP(s) having different operation modes. For example, in one embodiment, the network may configure the UE with a first WUS BWP for extreme power saving and optionally one or more second WUS BWPs for normal operation. In this embodiment, the UE may be operating on the normal WUS-based BWP for part of the operation (for instance during Short DRX cycles) and may switch to and back from the WUS BWP for extreme power saving under certain conditions (for instance between Long DRX cycles, upon a trigger for entering a Long DRX cycle is met).

In some examples, extreme power saving may refer to a configuration of the WUS BWP in frequency and in time so as to minimize the UE power consumption when being on that BWP. This can include: in frequency domain, a very small bandwidth (for instance the bandwidth of the CORESET #0, if CORESET #0 is present) and, in time domain, use of a Long DRX cycle and/or use of Short DRX; the use of a larger parameter value of the k0 which controls the cross-slot scheduling configuration. It is noted that the control resource set (CORESET) is a specific area on the NR downlink resource grid in the frequency domain (i.e., a set of physical resources) and a set of parameters that is used to carry PDCCH/DCI. CORESET #0 is the common CORESET configured in MIB and in ServingCellConfigCommon. Other CORESETs are instead configured by dedicated signalling and, thus, are specific for a UE.

One aspect of example embodiments is that a WUS indication on a first WUS BWP may contain an implicit indication to the UE to wake up on a second BWP. For instance, the WUS indication on the first WUS BWP may contain an implicit indication to the UE to wake up on a second BWP. That is, in an embodiment, there is no explicit indication of which BWP to return to. In some examples, the second BWP may be the last BWP that the UE was using before switching to the first WUS BWP that carried this WUS indication.

In one embodiment, the WUS indication on one WUS BWP may indicate further actions beyond the switching to another BWP. The further actions may include modifying or deactivating dormant behavior. Dormant behavior may refer to the UE monitoring the radio link quality (e.g., radio resource monitoring—RRM) on a given cell and monitoring the channel quality (e.g., CQI). However, with dormant behavior, the UE will not monitor the PDCCH for data reception.

In one embodiment, there may be a timer associated to the operation on the WUS BWP. According to this embodiment, upon expiry of the timer, the UE may change behaviour for autonomous BWP selection such that the detection of the WUS on the WUS BWP will cause the UE to take other actions. That is, the UE may disable the BWP switching and monitor for PDCCH during on duration on the current WUS BWP.

Figure 1A:
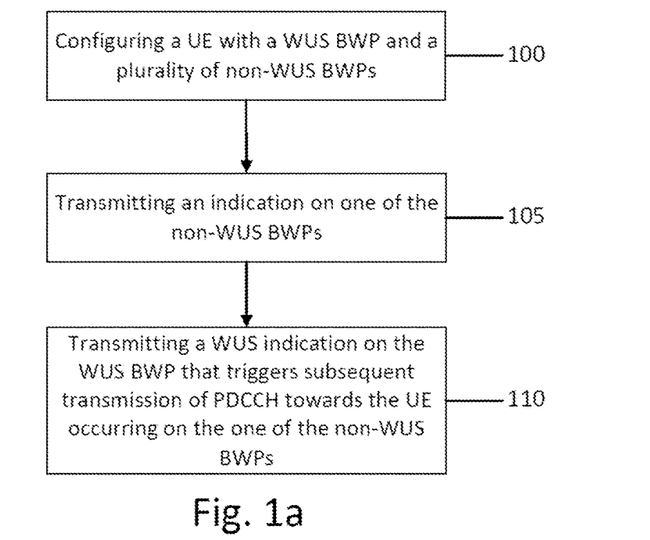
FIG. 1a illustrates an example flow diagram of a method, according to an embodiment.

FIG. 1a illustrates an example flow diagram of a method for control of cross-BWP WUS activation, according to one example embodiment. In certain example embodiments, the flow diagram of FIG. 1a may be performed by a network entity or network node in a communication system, such as LTE or 5G NR. For instance, in some example embodiments, the method of FIG. 1a may be performed by a base station, eNB, gNB, and/or NG-RAN node.

As illustrated in the example of FIG. 1a, the method may include, at 100, configuring a UE with a WUS BWP (i.e., a BWP configured with WUS) and a plurality of non-WUS BWPs (i.e., BWPs not configured with WUS). In an embodiment, the method may then include, at 110, transmitting WUS indication such that, when the UE moves from a first non-WUS BWP of the plurality of non-WUS BWPs to the WUS BWP, the reception of the WUS on the WUS BWP may trigger the UE to switch back to the first non-WUS BWP for PDCCH monitoring during the next on-duration. According to certain embodiments, the transmitting 110 of the WUS indication may include transmitting a WUS indication that contains an implicit indication to the UE to wake up on the previously used BWP (i.e., where the previously used BWP is the last BWP that the UE was using before switching to the first WUS BWP that carried this WUS indication).

According to certain embodiments, the method of FIG. 1a may also include configuring a timer associated to the operation on the WUS BWP. Upon expiry of the timer, the UE may change behaviour for autonomous BWP selection such that the detection of a WUS indication on the WUS BWP may cause the UE to take other actions. For example, these other actions may include disabling the BWP switching and monitoring for PDCCH during on-duration on the current WUS BWP. In an embodiment, the timer may be started after the reception of a WUS indication or based on other conditions.

Figure 1B:
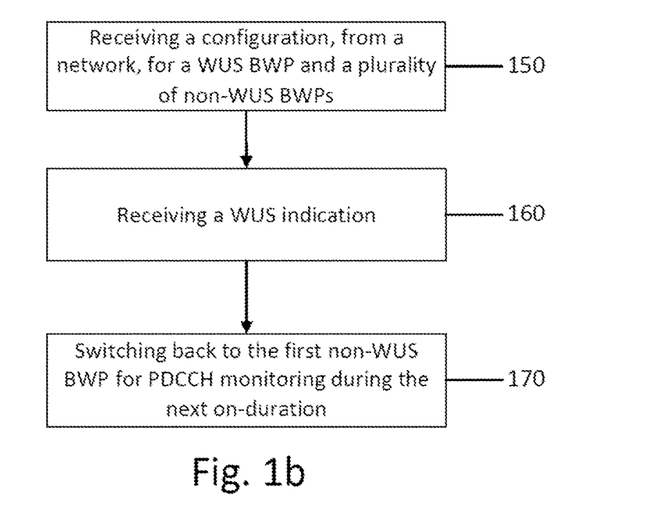
FIG. 1b illustrates an example flow diagram of a method, according to an embodiment.

FIG. 1b illustrates an example flow diagram of a method for control of cross-BWP WUS activation, according to one example embodiment. In certain example embodiments, the flow diagram of FIG. 1b may be performed by a network entity or network node in a communications system, such as LTE or 5G NR. For instance, in some example embodiments, the network entity may be a UE, mobile station, IoT device, or the like.

As illustrated in the example of FIG. 1b, the method may include, at 150, receiving a configuration, from a network, for a WUS BWP (i.e., a BWP configured with WUS) and a plurality of non-WUS BWPs (i.e., BWP not configured with WUS). In an embodiment, the method may also include, at 160, after moving from a first non-WUS BWP of the plurality of non-WUS BWPs to the WUS BWP, receiving a WUS indication on the WUS BWP and, at 170, switching back to the first non-WUS BWP for PDCCH monitoring during the next on-duration. In other words, in this embodiment, the reception of the WUS indication may trigger the UE to switch back to the first non-WUS BWP. In an embodiment, the WUS indication may include an implicit indication to the UE to wake up on the previously used BWP.

In some embodiments, the method of FIG. 1b may include receiving a configuration for a timer associated to the operation on the WUS BWP. In this embodiment, the method may then include, upon expiry of the timer, the UE changing behaviour for autonomous BWP selection such that the detection of a WUS on the WUS BWP may cause the UE to take other actions. For example, these other actions may include disabling the BWP switching and monitoring for PDCCH during on-duration on the current WUS BWP, thus without switching to a different BWP.

Figure 2A:
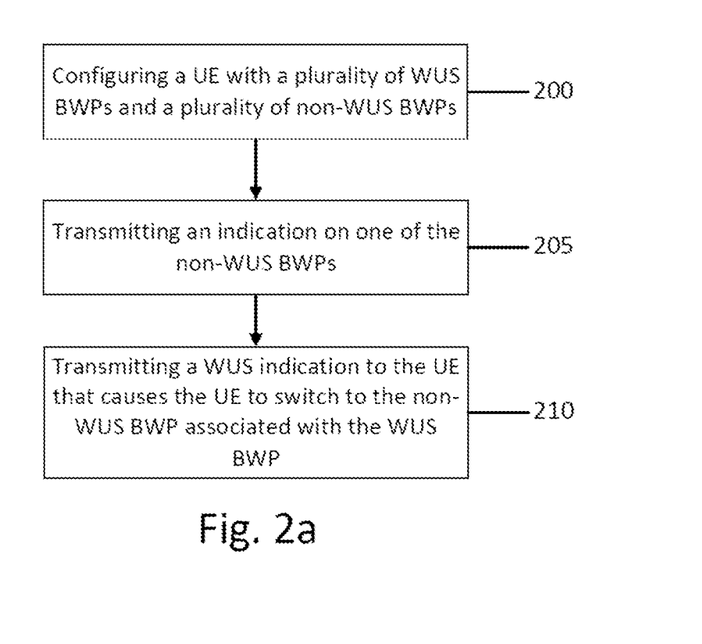
FIG. 2a illustrates an example flow diagram of a method, according to an embodiment.

FIG. 2a illustrates an example flow diagram of a method for control of cross-BWP WUS activation, according to one example embodiment. In certain example embodiments, the flow diagram of FIG. 2a may be performed by a network entity or network node in a communication system, such as LTE or 5G NR. For instance, in some example embodiments, the network node may be a base station, eNB, gNB, and/or NG-RAN node.

As illustrated in the example of FIG. 2a, the method may include, at 200, configuring a UE with a plurality of WUS BWPs (e.g., to allow different WUS configurations) and a plurality of non-WUS BWPs. In an embodiment, each of the WUS BWPs is associated with one of the non-WUS BWPs. In certain embodiments, the method may also include, at 210, transmitting a WUS indication to the UE such that, when the UE receives the WUS while being on a WUS BWP, the WUS causes the UE to switch to a non-WUS BWP associated with the WUS BWP. In an embodiment, the association between the non-WUS BWP and the WUS BWP may be configured by the network, for instance, as part of the configuring at 200. If no association is configured for a WUS BWP, then a default non-WUS BWP may be associated by the UE to the WUS BWP. It is noted that the UE switch to the non-WUS BWP associated with the WUS BWP is done irrespective of which non-WUS BWP the UE moved to the current WUS BWP from.

According to certain embodiments, the method of FIG. 2a may also include configuring a timer associated to the operation on the WUS BWP. Upon expiry of the timer, the UE may change behaviour for autonomous BWP selection such that the detection of the WUS on the WUS BWP may cause the UE to take other actions. For example, these other actions may include disabling the BWP switching and monitoring for PDCCH during on-duration on the current WUS BWP.

Figure 2B:
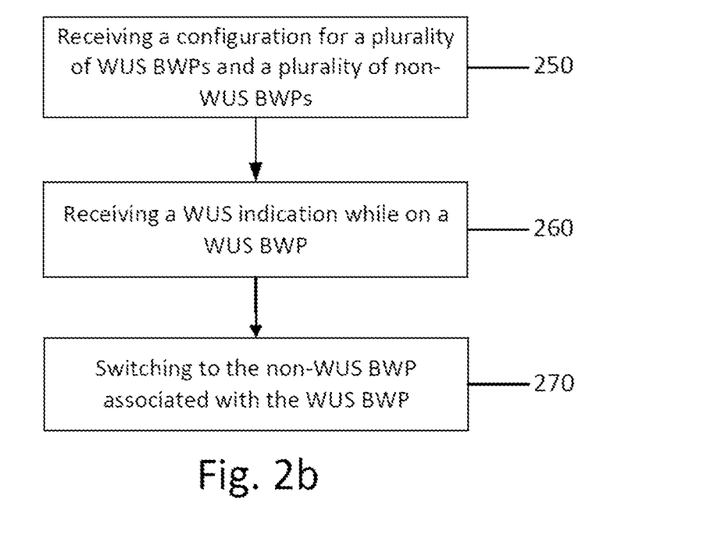
FIG. 2b illustrates an example flow diagram of a method, according to an embodiment.

FIG. 2b illustrates an example flow diagram of a method for control of cross-BWP WUS activation, according to one example embodiment. In certain example embodiments, the flow diagram of FIG. 2b may be performed by a network entity or network node in a communications system, such as LTE or 5G NR. For instance, in some example embodiments, the method of FIG. 2b may be performed by a UE, mobile station, IoT device, or the like.

As illustrated in the example of FIG. 2b, the method may include, at 250, receiving, from a network, a configuration for a plurality of WUS BWPs (e.g., to allow different WUS configurations) and a plurality of non-WUS BWPs. In an embodiment, each of the WUS BWPs is associated with one of the non-WUS BWPs. In certain embodiments, the method may also include, at 260, receiving a WUS indication while on a WUS BWP and, at 270, switching to the non-WUS BWP associated with the WUS BWP. According to an embodiment, the switching 270 includes switching to the non-WUS BWP associated with the WUS BWP irrespective of which non-WUS BWP the UE moved to the current WUS BWP from.

In some embodiments, the method of FIG. 2b may include receiving a configuration for a timer associated to the operation on the WUS BWP. In this embodiment, the method may then include, upon expiry of the timer, the UE changing behaviour for autonomous BWP selection such that the detection of the WUS on the WUS BWP may cause the UE to take other actions. For example, these other actions may include disabling the BWP switching and monitoring for PDCCH during on-duration on the current WUS BWP.

Figure 3A:
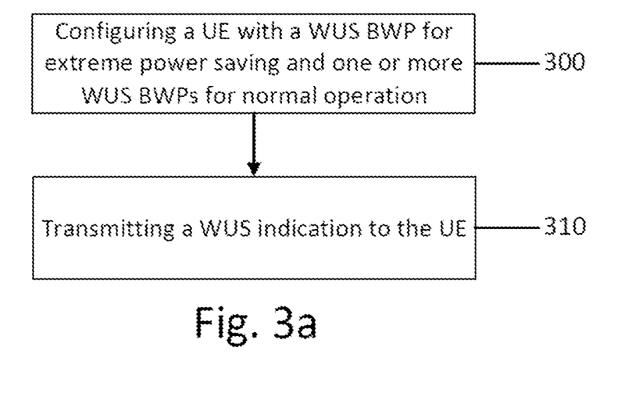
FIG. 3a illustrates an example flow diagram of a method, according to an embodiment.

FIG. 3a illustrates an example flow diagram of a method for control of cross-BWP WUS activation, according to one example embodiment. In certain example embodiments, the flow diagram of FIG. 3a may be performed by a network entity or network node in a communication system, such as LTE or 5G NR. For instance, in some example embodiments, the method of FIG. 3a may be performed by a base station, eNB, gNB, and/or NG-RAN node.

As illustrated in the example of FIG. 3a, the method may include, at 300, configuring a UE with a WUS BWP for extreme power saving and one or more WUS BWPs for normal operation. In this embodiment, the UE may be configured to operate on the normal WUS-based BWP for part of the operation (for instance during Short DRX cycles) and to switch to and back from the WUS BWP for extreme power saving under certain conditions, such as between Long DRX cycles. In certain embodiments, the method may also include, at 310, transmitting a WUS indication to the UE. According to certain embodiments, the transmitting 310 of the WUS indication may include transmitting a WUS indication that contains an implicit indication to the UE to wake up on the previously used BWP.

According to certain embodiments, the method of FIG. 3a may also include configuring a timer associated to the operation on the WUS BWP. Upon expiry of the timer, the UE may change behaviour for autonomous BWP selection such that the detection of the WUS on the WUS BWP may cause the UE to take other actions. For example, these other actions may include disabling the BWP switching and monitoring for PDCCH during on-duration on the current WUS BWP.

Figure 3B:
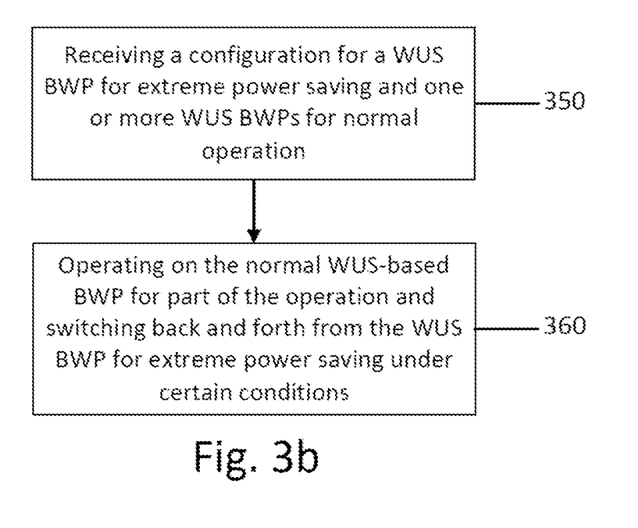
FIG. 3b illustrates an example flow diagram of a method, according to an embodiment.

FIG. 3b illustrates an example flow diagram of a method for control of cross-BWP WUS activation, according to one example embodiment. In certain example embodiments, the flow diagram of FIG. 3b may be performed by a network entity or network node in a communications system, such as LTE or 5G NR. For instance, in some example embodiments, the method of FIG. 3b may be performed by a UE, mobile station, IoT device, or the like.

As illustrated in the example of FIG. 3b, the method may include, at 350, receiving, from a network, a configuration for a WUS BWP for extreme power saving and one or more WUS BWPs for normal operation. In this embodiment, the method may also include, at 360, operating on the normal WUS-based BWP for part of the operation (for instance during Short DRX cycles) and switching back and forth from the WUS BWP for extreme power saving under certain conditions, such as between Long DRX cycles.

In some embodiments, the method of FIG. 3b may include receiving a configuration for a timer associated to the operation on the WUS BWP. In this embodiment, the method may then include, upon expiry of the timer, the UE changing behaviour for autonomous BWP selection such that the detection of the WUS on the WUS BWP may cause the UE to take other actions. For example, these other actions may include disabling the BWP switching and monitoring for PDCCH during on-duration on the current WUS BWP.

It should be noted that the example embodiments depicted FIGS. 1, 2, and 3 may be combined together in any suitable manner, according to certain embodiments.

Figure 4A:
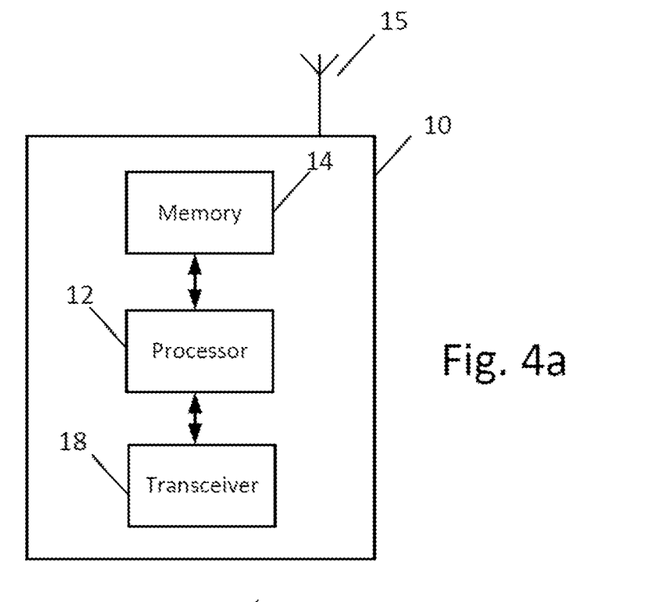
FIG. 4a illustrates an example block diagram of an apparatus, according to an embodiment.

FIG. 4a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be NG-RAN node, an eNB in LTE, or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4a.

As illustrated in the example of FIG. 4a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the example embodiments described herein, such as the flow or signaling diagrams illustrated in FIG. 1a, 2a, or 3a. In some embodiments, apparatus 10 may be configured to perform a procedure for control of cross-BWP WUS activation, for example. In an embodiment, apparatus 10 may represent a network node, such as a gNB or NG-RAN node.

In an embodiment, apparatus 10 may be controlled by memory 14 and processor 12 to configure a UE with a WUS BWP (i.e., a BWP configured with WUS) and a plurality of non-WUS BWPs (i.e., BWP not configured with WUS). In an embodiment, apparatus 10 may be controlled by memory 14 and processor 12 to transmit WUS indication such that, when the UE moves from a first non-WUS BWP of the plurality of non-WUS BWPs to the WUS BWP, the reception of the WUS on the WUS BWP may trigger the UE to switch back to the first non-WUS BWP for PDCCH monitoring during the next on-duration. According to certain embodiments, apparatus 10 may be controlled by memory 14 and processor 12 to transmit a WUS indication that contains an implicit indication to the UE to wake up on the previously used BWP.

In another embodiment, apparatus 10 may be controlled by memory 14 and processor 12 to configure a UE with a plurality of WUS BWPs (e.g., to allow different WUS configurations) and a plurality of non-WUS BWPs. In an embodiment, each of the WUS BWPs is associated with one of the non-WUS BWPs. In certain embodiments, apparatus 10 may be controlled by memory 14 and processor 12 to transmit a WUS indication to the UE such that, when the UE receives the WUS indication while being on a WUS BWP, the WUS indication causes the UE to switch to the non-WUS BWP associated with the WUS BWP. It is noted that the UE switch to the non-WUS BWP associated with the WUS BWP is performed irrespective of which non-WUS BWP the UE moved to the current WUS BWP from.

In an embodiment, apparatus 10 may be controlled by memory 14 and processor 12 to configure a UE with a WUS BWP for extreme power saving and one or more WUS BWPs for normal operation. In this embodiment, apparatus 10 may be controlled by memory 14 and processor 12 to configure the UE to operate on the normal WUS-based BWP for part of the operation (for instance during Short DRX cycles) and to switch to and back from the WUS BWP for extreme power saving under certain conditions, such as between Long DRX cycles. In certain embodiments, apparatus 10 may be controlled by memory 14 and processor 12 to transmit a WUS indication to the UE. According to certain embodiments, apparatus 10 may be controlled by memory 14 and processor 12 to transmit a WUS indication that contains an implicit indication to the UE to wake up on the previously used BWP.

According to a further embodiment, apparatus 10 may be controlled by memory 14 and processor 12 to configure a timer associated to the operation on the WUS BWP. Upon expiry of the timer, the UE may change behaviour for autonomous BWP selection such that the detection of the WUS on the WUS BWP may cause the UE to take other actions. For example, these other actions may include disabling the BWP switching and monitoring for PDCCH during on-duration on the current WUS BWP.

Figure 4B:
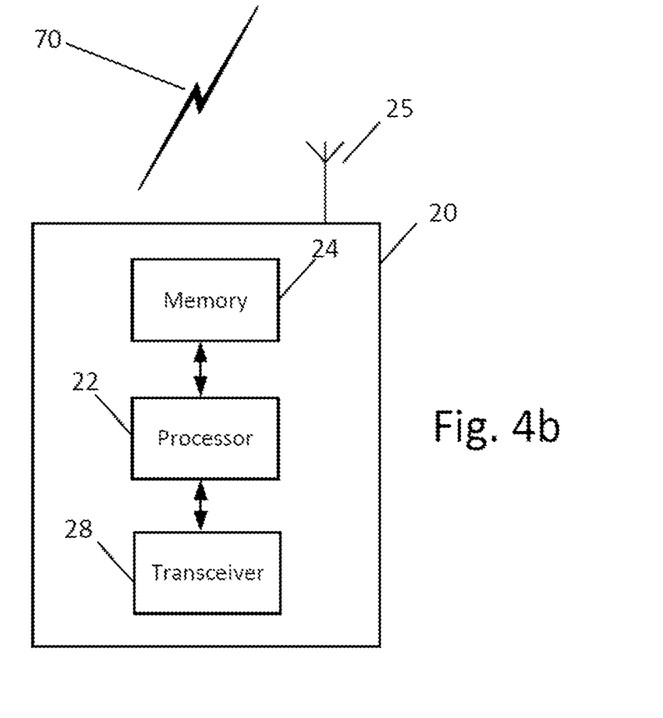
FIG. 4b illustrates an example block diagram of an apparatus, according to an embodiment.

FIG. 4b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4b.

As illustrated in the example of FIG. 4b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1b, 2b, or 3b. In certain embodiments, apparatus 20 may include or represent a UE and may be configured to perform a procedure relating to control of cross-BWP WUS activation, for instance.

In certain embodiments, apparatus 20 may be controlled by memory 24 and processor 22 to receive a configuration, from a network node, for a WUS BWP (i.e., a BWP configured with WUS) and a plurality of non-WUS BWPs (i.e., BWP not configured with WUS). In an embodiment, apparatus 20 may be controlled by memory 24 and processor 22 to receive, after moving from a first non-WUS BWP of the plurality of non-WUS BWPs to the WUS BWP, a WUS indication and to switch back to the first non-WUS BWP for PDCCH monitoring during the next on-duration. In other words, in this embodiment, the reception of the WUS may trigger the apparatus 20 to switch back to the first non-WUS BWP. In an embodiment, the WUS indication may include an implicit indication to the apparatus 20 to wake up on the previously used BWP.

In another embodiment, apparatus 20 may be controlled by memory 24 and processor 22 to receive, from a network node, a configuration for a plurality of WUS BWPs (e.g., to allow different WUS configurations) and a plurality of non-WUS BWPs. In an embodiment, each of the WUS BWPs is associated with one of the non-WUS BWPs. In certain embodiments, apparatus 20 may be controlled by memory 24 and processor 22 to receive a WUS indication while on a WUS BWP and to switch to the non-WUS BWP associated with the WUS BWP. According to an embodiment, apparatus 20 may be controlled by memory 24 and processor 22 to switch to the non-WUS BWP associated with the WUS BWP irrespective of which non-WUS BWP the UE moved to the current WUS BWP from.

In another embodiment, apparatus 20 may be controlled by memory 24 and processor 22 to receive, from a network node, a configuration for a WUS BWP for extreme power saving and one or more WUS BWPs for normal operation. In this embodiment, apparatus 20 may be controlled by memory 24 and processor 22 to operate on the normal WUS-based BWP for part of the operation (for instance during Short DRX cycles) and to switch back and forth from the WUS BWP for extreme power saving under certain conditions, such as between Long DRX cycles.

In some embodiments, apparatus 20 may be controlled by memory 24 and processor 22 to receive a configuration for a timer associated to the operation on the WUS BWP. In this embodiment, apparatus 20 may be controlled by memory 24 and processor 22 to, upon expiry of the timer, change behaviour for autonomous BWP selection such that the detection of the WUS on the WUS BWP may cause the apparatus 20 to take other actions. For example, these other actions may include to disable the BWP switching and to monitor for PDCCH during on-duration on the current WUS BWP.

Therefore, certain example embodiments provide several technological improvements, enhancements, and/or advantages over existing technological processes and constitute an improvement at least to the technological field of wireless network control and management. For example, according to certain embodiments, the network does not need to explicitly switch the UE to the BWP tailored for data transmission from the WUS-BWP via DCI, which would consume power. Example embodiments allow the network and UE to be in synch about the active BWP of the UE at any given time, without requiring an explicit network signalling for BWP switch despite having multiple potential candidates for BWP switch (i.e., more than one non-WUS BWP configured). Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

The invention claimed is:

1. An apparatus, comprising: at least one processor; and
at least one memory comprising computer program code, the at least one memory and computer program code configured, with the at least one processor, to cause the apparatus at least to:
receive a wake up signaling indication, wherein the apparatus is configured with a wake up signaling bandwidth part and a plurality of non-wake up signaling bandwidth parts;
based on the wake up signaling indication, cause the apparatus to move from a first non-wake up signaling bandwidth part of the plurality of non-wake up signaling bandwidth parts to the wake up signaling bandwidth part,
wherein the wake up signaling indication triggers further action comprising deactivating dormant behavior, and
wherein the dormant behavior refers to the apparatus monitoring radio link quality of a cell and monitoring a channel quality and not monitoring a physical downlink control channel for data reception;
receive a configuration for a second wake up signaling bandwidth part for extreme power saving, wherein the wake up signaling bandwidth part is for normal operation during short DRX cycles;
operate on the wake up signaling based bandwidth part for part of the operation and switch back and forth from the second wake up signaling bandwidth part for extreme power saving during long DRX cycles, the extreme power saving being a configuration of the wake up signaling based bandwidth part in frequency and in time so as to minimize the apparatus power consumption when being on that bandwidth part;
receive a configuration for a timer associated to an operation on the wake up signaling bandwidth part;
upon expiry of the timer, change behavior for autonomous bandwidth part selection such that a detection of the wake up signaling on the wake up signaling bandwidth part causes the apparatus to disable bandwidth part switching and monitoring for physical downlink control channel during on-duration on the wake up signaling bandwidth part; and
based on the wake up signaling indication being received on the wake up signaling bandwidth part, trigger the apparatus to switch back to the first non-wake up signaling bandwidth part for physical downlink control channel monitoring during the next on-duration, wherein the switching to the first non-wake up signaling bandwidth part is done irrespective of which non-wake up signaling bandwidth part of the plurality of non-wake up signaling bandwidth parts the apparatus moved to the wake up signaling bandwidth part from.

2. The apparatus according to claim 1, wherein the wake up signaling indication comprises an implicit indication to the apparatus to wake up on a previously used bandwidth part.

3. The apparatus according to claim 2, wherein a part of the operation comprises during short discontinuous reception cycles, the certain conditions comprise between long discontinuous reception cycles.

4. The apparatus according to claim 3, wherein the apparatus is a user equipment.

5. The apparatus according to claim 4, wherein the wake up signaling bandwidth part is associated with the first non-wake up signaling bandwidth part of the plurality of non-wake up signaling bandwidth parts.

6. A system comprising: a user equipment;
a processor; and
a memory comprising computer program code, the memory and computer program code configured, with the processor, to cause the user equipment at least to:
receive a wake up signaling indication, wherein the apparatus is configured with a wake up signaling bandwidth part and a plurality of non-wake up signaling bandwidth parts;
based on the wake up signaling indication, cause the apparatus to move from a first non-wake up signaling bandwidth part of the plurality of non-wake up signaling bandwidth parts to the wake up signaling bandwidth part,
wherein the wake up signaling indication triggers further action comprising deactivating dormant behavior, and wherein the dormant behavior refers to the apparatus monitoring radio link quality of a cell and monitoring a channel quality and not monitoring a physical downlink control channel for data reception;

receive a configuration for a second wake up signaling bandwidth part for extreme power saving, wherein the wake up signaling bandwidth part is for normal operation during short DRX cycles;

operate on the wake up signaling based bandwidth part for part of the operation and switch back and forth from the second wake up signaling bandwidth part for extreme power saving during long DRX cycles, the extreme power saving being a configuration of the wake up signaling based bandwidth part in frequency and in time so as to minimize the apparatus power consumption when being on that bandwidth part;

receive a configuration for a timer associated to an operation on the wake up signaling bandwidth part;

upon expiry of the timer, change behavior for autonomous bandwidth part selection such that a detection of the wake up signaling on the wake up signaling bandwidth part causes the apparatus to disable bandwidth part switching and monitoring for physical downlink control channel during on-duration on the wake up signaling bandwidth part; and based on the wake up signaling indication being received on the wake up signaling bandwidth part, trigger the apparatus to switch back to the first non-wake up signaling bandwidth part for physical downlink control channel monitoring during the next on-duration, wherein the switching to the first non-wake up signaling bandwidth part is done irrespective of which non-wake up signaling bandwidth part of the plurality of non-wake up signaling bandwidth parts the apparatus moved to the wake up signaling bandwidth part from.

7. The system according to claim 6, wherein the wake up signaling indication comprises an implicit indication to the apparatus to wake up on a previously used bandwidth part.

8. The system according to claim 7, wherein a part of the operation comprises during short discontinuous reception cycles, the certain conditions comprise between long discontinuous reception cycles.

9. The system according to claim 8, wherein the wake up signaling bandwidth part is associated with the first non-wake up signaling bandwidth part of the plurality of non-wake up signaling bandwidth parts.

10. A method comprising:

receiving, by an apparatus, a wake up signaling indication, wherein the apparatus is configured with a wake up signaling bandwidth part and a plurality of non-wake up signaling bandwidth parts;

based on the wake up signaling indication, causing the apparatus to move from a first non-wake up signaling bandwidth part of the plurality of non-wake up signaling bandwidth parts to the wake up signaling bandwidth part;

wherein the wake up signaling indication triggers further action comprising deactivating dormant behavior, and wherein the dormant behavior refers to the apparatus monitoring radio link quality of a cell and monitoring a channel quality and not monitoring a physical downlink control channel for data reception;

receiving a configuration for a second wake up signaling bandwidth part for extreme power saving, wherein the wake up signaling bandwidth part is for normal operation during short DRX cycles;

operating on the wake up signaling based bandwidth part for part of the operation and switch back and forth from the second wake up signaling bandwidth part for extreme power saving during long DRX cycles, the extreme power saving being a configuration of the wake up signaling based bandwidth part in frequency and in time so as to minimize the apparatus power consumption when being on that bandwidth part;

receiving a configuration for a timer associated to an operation on the wake up signaling bandwidth part;

upon expiry of the timer, changing behavior for autonomous bandwidth part selection such that a detection of the wake up signaling on the wake up signaling bandwidth part causes the apparatus to disable bandwidth part switching and monitoring for physical downlink control channel during on-duration on the wake up signaling bandwidth part; and based on the wake up signaling indication being received on the wake up signaling bandwidth part, triggering the apparatus to switch back to the first non-wake up signaling bandwidth part for physical downlink control channel monitoring during the next on-duration, wherein the switching to the first non-wake up signaling bandwidth part is done irrespective of which non-wake up signaling bandwidth part of the plurality of non-wake up signaling bandwidth parts the apparatus moved to the wake up signaling bandwidth part from.

11. The method according to claim 10, wherein the wake up signaling indication comprises an implicit indication to the apparatus to wake up on a previously used bandwidth part.

12. The method according to claim 11, wherein a part of the operation comprises during short discontinuous reception cycles, the certain conditions comprise between long discontinuous reception cycles.

13. The method according to claim 12, wherein the wake up signaling bandwidth part is associated with the first non-wake up signaling bandwidth part of the plurality of non-wake up signaling bandwidth parts.

14. The method according to claim 13, wherein the apparatus is a user equipment.

* * * * *